United States Patent
Cogne et al.

(10) Patent No.: US 8,720,515 B2
(45) Date of Patent: May 13, 2014

(54) TIRE FOR HEAVY VEHICLES COMPRISING AT LEAST TWO ADDITIONAL LAYERS IN THE BEADS

(75) Inventors: Michael Cogne, Riom (FR); Agnes Degeorges, Clermont-Ferrand (FR)

(73) Assignees: Michelin Recherche et Technique S.A., Granges-Paccot (CH); Compagnie Generale des Etablissements Michelin, Clermont-Ferrand (FR)

(*) Notice: Subject to any disclaimer, the term of this patent is extended or adjusted under 35 U.S.C. 154(b) by 369 days.

(21) Appl. No.: 13/061,900

(22) PCT Filed: Sep. 1, 2009

(86) PCT No.: PCT/EP2009/061293
§ 371 (c)(1),
(2), (4) Date: May 23, 2011

(87) PCT Pub. No.: WO2010/026143
PCT Pub. Date: Mar. 11, 2010

(65) Prior Publication Data
US 2011/0232819 A1 Sep. 29, 2011

(30) Foreign Application Priority Data
Sep. 2, 2008 (FR) .................................. 08 55890

(51) Int. Cl.
*B60C 15/06* (2006.01)
(52) U.S. Cl.
USPC ........................... 152/543; 152/539; 152/552
(58) Field of Classification Search
USPC ........................... 152/539–547, 555
See application file for complete search history.

(56) References Cited

U.S. PATENT DOCUMENTS

| 2,822,018 | A | * | 2/1958 | Perdriau | 152/543 |
| 3,941,177 | A | | 3/1976 | Okada et al. | |
| 5,837,077 | A | | 11/1998 | Kabe et al. | |
| 7,918,259 | B2 | * | 4/2011 | Yamamoto | 152/533 |
| 8,555,942 | B2 | | 10/2013 | Cluzel | |

FOREIGN PATENT DOCUMENTS

| EP | 1 595 996 | | 11/2005 |
| EP | 1 795 375 | | 6/2007 |
| FR | 2 887 813 | | 1/2007 |
| JP | 60-42107 | | 3/1985 |
| JP | 05-294117 | | 11/1993 |
| JP | 08-91026 | | 4/1996 |
| JP | 09-240213 | | 9/1997 |
| JP | 10 217353 | | 8/1998 |
| JP | 2000-062416 | | 2/2000 |
| JP | 2001-130229 | * | 5/2001 |

(Continued)

*Primary Examiner* — Justin Fischer
*Assistant Examiner* — Robert Dye
(74) *Attorney, Agent, or Firm* — Cozen O'Connor

(57) ABSTRACT

A tire with a radial carcass reinforcement comprising a crown reinforcement, itself radially capped by a tread strip, the said tread strip being connected to two beads via two sidewalls, the carcass reinforcement being anchored in each of the beads to form an anchorage region. The tire additionally comprises, in part of at least each of the anchorage regions, at least two layers formed by circumferential winding of a complex strip formed of two layers consisting of continuous reinforcing elements passing from one layer to the other, the said reinforcing elements being parallel within a layer and crossed from one layer to the other at angles with respect to the circumferential direction that are identical in terms of absolute value.

11 Claims, 2 Drawing Sheets

(56) References Cited

FOREIGN PATENT DOCUMENTS

| | | |
|---|---|---|
| JP | 2004-074827 | 3/2004 |
| JP | 2004-196095 | 7/2004 |
| JP | 2004-314681 | 11/2004 |
| JP | 2006-035958 | 2/2006 |
| JP | 2007-537081 | 12/2007 |
| WO | WO 2005/016668 | 2/2005 |
| WO | WO 2006/035560 | 4/2006 |

* cited by examiner

TIRE FOR HEAVY VEHICLES COMPRISING AT LEAST TWO ADDITIONAL LAYERS IN THE BEADS

RELATED APPLICATION

This is a U.S. National Phase Application under 35 USC 371 of International Application PCT/EP2009/061293, filed on Sep. 1, 2009.

This application claims the priority of French patent application Ser. No. 08/55890 filed Sep. 2, 2008, the entire content of which is hereby incorporated by reference.

FIELD OF THE INVENTION

The present invention relates to a tire with a radial carcass reinforcement and more particularly to a tire intended to be fitted to vehicles that carry heavy loads and drive at a sustained speed, such as, for example, lorries, tractors, trailers, road buses, metro rolling stock, agricultural or construction machinery, airplanes, or other transport or handling vehicles.

BACKGROUND OF THE INVENTION

Reinforcements or reinforcing structures for tires, and particularly for tires of vehicles of the heavy-goods type, are currently—and usually—made up of a stack of one or more plies conventionally known as "carcass plies", "crown plies", etc. This way of naming the reinforcements stems from the method of manufacture which consists in producing a series of semi-finished products in the form of plies, provided with threadlike reinforcing elements, often longitudinal, which are then assembled or stacked in order to build a tire preform. The plies are produced flat, with large dimensions, and then cut to suit the dimensions of a given product. The plies are also assembled, initially, substantially flat. The preform thus produced is then shaped into the toroidal profile typical of tires. The semi-finished products known as "finishing" products are then applied to the preform to obtain a product that is ready to be vulcanized.

A "conventional" type of method such as this entails, particularly during the phase of manufacturing the tire preform, the use of an anchoring element (generally a bead wire) which is used to anchor or secure the carcass reinforcement in the region of the beads of the tire. Thus, in this type of method, a portion of all the plies (or just some of the plies) that make up the carcass reinforcement is wrapped around a bead wire positioned in the bead of the tire. Thus, the carcass reinforcement is anchored in the bead.

The fact that this conventional type of method is widespread throughout the tire-manufacturing industry, in spite of there being numerous alternative ways of producing the plies and the assemblies, has led those skilled in the art to employ a vocabulary hinged on the method; hence the terminology generally accepted which in particular includes the terms "plies", "carcass", "bead wire", "shaping" to denote the change from a flat profile to a toroidal profile, etc.

Nowadays, there are tires which do not, strictly speaking, have any "plies" or "bead wires" consistent with the above definitions. For example, document EP 0 582 196 describes tires manufactured without the use of semi-finished products in the form of plies. For example, the reinforcing elements of the various reinforcing structures are applied directly to the adjacent layers of rubber compounds, all of this being applied in successive layers to a toroidal core the shape of which allows a profile similar to the final profile of the tire being manufactured to be obtained directly. Thus, in this case, there are no longer any "semi-finished" products, or any "plies" or any "bead wires". The base products, such as the rubber compounds and the reinforcing elements in the form of threads or filaments, are applied directly to the core. Because this core is of toroidal shape, there is no longer any need to shape the preform in order to change from a flat profile to a profile in the shape of a torus.

Furthermore, the tires described in that document do not have any "traditional" wrapping of the carcass ply around a bead wire. That type of anchorage is replaced by an arrangement whereby circumferential threads are positioned adjacent to the said sidewall reinforcing structure, everything being embedded in an anchoring or bonding rubber compound.

There are also methods of assembly onto a toroidal core that employ semi-finished products specifically adapted for rapid, effective and simple placement on a central core. Finally, it is also possible to use a hybrid comprising both certain semi-finished products for achieving certain architectural aspects (such as plies, bead wires, etc.) while others are achieved by applying compounds and/or reinforcing elements directly.

In this document, in order to take account of recent technological evolutions both in the field of manufacture and in the design of products, the conventional terms such as "plies" "bead wires", etc., are advantageously replaced by terms which are neutral or independent of the type of method used. Thus, the term "carcass-type reinforcement" or "sidewall reinforcement" can be used to denote the reinforcing elements of a carcass ply in the conventional method and the corresponding reinforcing elements, generally applied to the sidewalls, of a tire produced according to a method that does not involve semi-finished products. The term "anchoring region", for its part, can denote the "traditional" wrapping of the carcass ply around a bead wire in a conventional method, just as easily as it can denote the assembly formed by the circumferential reinforcing elements, the rubber compound and the adjacent sidewall reinforcing portions of a bottom region produced using a method that involves application onto a toroidal core.

Generally, in tires of the heavy-goods type, the carcass reinforcement is anchored on each side in the bead region and is radially surmounted by a crown reinforcement consisting of at least two layers, which are superposed and formed of threads or cords that are parallel within each layer. It may also comprise a layer of metal threads or cords with low extensibility making an angle of between 45° and 90° with the circumferential direction, this ply, known as the triangulation ply, being situated radially between the carcass reinforcement and the first crown ply known as the working ply, formed of parallel threads or cords at angles of at most 45° in terms of absolute value. The triangulation ply forms, with at least the said working ply, a triangulated reinforcement which, under the various stresses to which it is subjected, suffers little by way of deformation, the triangulation ply having the essential role of reacting the transverse compressive loads to which the collection of reinforcing elements is subjected in the region of the crown of the tire.

The crown reinforcement comprises at least one working layer; when the said crown reinforcement comprises at least two working layers, these are formed of inextensible metal reinforcing elements that are parallel to one another within each layer and crossed from one layer to the next, making angles of between 10° and 45° with the circumferential direction. The said working layers that form the working reinforcement may even be covered with at least one layer known as a protective layer and formed of reinforcing elements that are advantageously made of metal and extensible, known as elastic elements.

In the case of tires for "heavy-goods" vehicles, just one protective layer is usually present and its protective elements are, in most cases, directed in the same direction and at the same angle in terms of absolute value as those of the reinforcing elements of the radially outermost and therefore radially adjacent working layer. In the case of construction machinery tires intended to run over fairly uneven ground, the presence of two protective layers is advantageous, the reinforcing elements being crossed from one layer to the next and the reinforcing elements in the radially inner protective layer being crossed with the inextensible reinforcing elements in the radially outer working layer adjacent to the said radially inner protective layer.

Such tires also usually comprise, in the beads, one or more layers of reinforcing elements known as stiffeners. These layers usually consist of reinforcing elements which, with respect to the circumferential direction, are oriented at an angle of smaller than 45°, and most often of smaller than 25°. These layers of reinforcing elements notably have the function of limiting the longitudinal movements of the materials of which the bead is made with respect to the rim of the wheel in order to limit premature wearing of the said bead.

Moreover, when the crown reinforcement is anchored around a bead wire, a process which consists in winding the carcass reinforcement at least partially around a bead wire in each of the beads, forming a turn-back extending up the sidewall to a greater or lesser extent, the layers of reinforcing elements or stiffener may also limit the onset of delamination between the turn-back of the carcass reinforcement and the materials based on polymer compounds surrounding the said turn-back. The problem is that this type of anchorage between the carcass reinforcement and the bead wire can, depending on the conditions of use, lead to risks of delamination between the turn-back of the carcass reinforcement and the materials based on polymer compounds surrounding the said turn-back.

These layers of reinforcing elements or stiffener are usually arranged axially on the outside of the turn-back of the carcass reinforcement and extend up the sidewall by a height that is greater than the height of the turn-back, notably in order to cover the free ends of the reinforcing elements in the said turn-back.

Cords are said to be inextensible when the said cords exhibit a relative elongation of at most 0.2% under a tensile force equal to 10% of the breaking strength.

Cords are said to be elastic when the said cords exhibit a relative elongation of at least 4% under a tensile force equal to the breaking strength.

The circumferential direction of the tire, or longitudinal direction, is the direction corresponding to the periphery of the tire and defined by the direction in which the tire runs.

The transverse or axial direction of the tire is parallel to the axis of rotation of the tire.

The radial direction is the direction that intersects the axis of rotation of the tire and is perpendicular thereto.

The axis of rotation of the tire is the axis about which it rotates under normal use.

A radial or meridian plane is a plane which contains the axis of rotation of the tire.

The circumferential mid-plane or equatorial plane is a plane perpendicular to the axis of rotation of the tire and which divides the tire into two halves.

Certain current tires known as "road" tires are intended to run at high speed for increasingly long distances because of improvements to the road network and because of the growth of the motorway network throughout the world. All of the conditions under which a tire such as this is called upon to run undoubtedly allows the number of kilometers covered to be increased, as tire wear is lower, but on the other hand the endurance of this tire is thereby penalized.

It has actually become apparent that certain running conditions lead notably in both parts of the tire surrounding the beads, to degradation of the masses of polymer compounds, entailing tire replacement.

SUMMARY OF THE INVENTION

It is an object of the invention to provide tires for vehicles carrying heavy loads of which the endurance performance, notably connected with the bead regions of the tire, is improved over conventional tires.

This objective is achieved according to one aspect of the invention by a tire with a radial carcass reinforcement comprising a crown reinforcement, itself radially capped by a tread strip, the said tread strip being connected to two beads via two sidewalls, the carcass reinforcement being anchored in each of the beads to form an anchorage region, the said tire additionally comprising, in part of at least each of the anchorage regions, at least two layers formed by circumferential winding of a complex strip formed of two layers consisting of continuous reinforcing elements passing from one layer to the other, the said reinforcing elements being parallel within a layer and crossed from one layer to the other at angles with respect to the circumferential direction that are identical in terms of absolute value.

Tests carried out on tires thus defined have revealed that the performance in terms of tire endurance is improved over tires of a more traditional design comprising elements of the stiffener type, as described previously, consisting of one or more layers of reinforcing elements. One interpretation of these results might be to note that the additional complex strip, more specifically the reinforcing elements in the additional complex strip, limit the spread of any beginnings of cracks there might be at the end of turn-back of the layer of carcass reinforcement and that, further, the absence of free ends of the layers of the complex strip, which correspond to the ends of cut cords of the conventional layers of reinforcing elements means that potential sources of disruption of the polymer compounds are no longer created.

The tire thus produced and, more specifically, the complex strip which comprises layers of reinforcing elements that are parallel within a layer and crossed from one layer to the other and that have no ends on their edges, is characterized by being relatively simple to implement; what happens is that two layers are produced simultaneously by circumferential winding of a prefabricated element that the complex strip constitutes. Circumferential winding is in fact a relatively simple technique to perform and which can be carried out at high speed; further, as recalled hereinabove, at least two layers are produced simultaneously.

A circumferential winding corresponds to a winding of the complex strip in such a way that the turns formed make an angle of less than 8° with the circumferential direction.

According to one preferred embodiment of the invention, the radial distance between the respective reinforcing elements of each of the crown layers forming a complex strip is less than the thickness of a crown layer and preferably less than half the thickness of a crown layer.

Within the meaning of the invention, the radial distance between the respective reinforcing elements of each of the crown layers is measured radially between the respectively upper and lower generatrices of the said reinforcing elements of the radially inner and radially outer crown layers. The thickness of the crown layer is also measured in the radial direction.

Preferably also, with each of the layers being formed of reinforcing elements between two liners made of polymer compounds each forming a thickness radially on the outside and radially on the inside of the said reinforcing elements, the radial distance between the respective reinforcing elements of each of the crown layers is substantially equivalent to the sum of the thickness of polymer compound in the liner radially on the outside of the reinforcing elements of the radially inner crown layer and of the thickness of polymer compound in the liner radially on the inside of the reinforcing elements of the radially outer crown layer.

The complex strip may be obtained in advance using a method that involves flattening a tube, itself formed by winding, in contiguous turns at a given angle with respect to the longitudinal direction of the tube, a tape in which reinforcing elements are parallel to one another and to the longitudinal direction of the said tape and coated in a polymer compound. The width of the tape is adjusted to suit the angle at which the turns are wound, to make the turns contiguous.

When the said tube is flattened, because the turns are perfectly contiguous, the complex strip obtained consists of two layers of continuous reinforcing elements passing from one layer to the other, the said reinforcing elements being parallel in one layer and crossed from one layer to the other at angles with respect to the circumferential direction that are identical in terms of absolute value. Producing a tube with contiguous turns makes it possible to obtain linear reinforcing elements in each of the layers, with the exception of the axial ends of each of the layers, where the reinforcing elements form loops to ensure the continuity between one layer and the next.

This linearity of the reinforcing elements in each of the layers allows constant longitudinal rigidity and constant shear rigidity to be conferred upon the entire width of the said layers that form the complex strip.

The flattening of the said tube also makes it possible to obtain coupling between the layers so that the radial distance between the respective reinforcing elements of each of the layers is substantially equivalent to the sum of the thickness of polymer compound in the liner radially on the outside of the reinforcing elements of the radially inner layer and of the thickness of polymer compound in the liner radially on the inside of the reinforcing elements of the radially outer layer, the said liners coming into contact with one another.

Such coupling between the two crown layers encourages high longitudinal rigidity and high shear rigidity. An indirect consequence of this is that the tire becomes lighter as it would require several layers of complex strip if the layers of which these strips were formed were not sufficiently coupled so that the desired longitudinal and shear rigidities could be obtained.

According to one particularly advantageous embodiment, the reinforcing elements of the said complex strip make an angle of between 10 and 45° with the circumferential direction.

As explained previously, the angle formed by the reinforcing elements with the circumferential direction corresponds to the angle that the turns of the tube make with the longitudinal direction of the tube before this tube is flattened. Small angles may make the complex strip easier to produce using the method as described hereinabove.

According to a first alternative form of embodiment, the complex strip is wound circumferentially with a radial overlap, preferably equal to at least half the width of the said complex strip. Radial overlap makes it possible to avoid the creation of regions in which the presence of reinforcing elements is not as great. Having a radial overlap of at least half the width of the complex strip makes it possible to produce simultaneously four working layers the reinforcing elements of which are crossed from one layer to the next, the angles of the reinforcing elements being identical in terms of absolute value in each of the layers.

A radial overlap at least equal to two-thirds of the width of the complex strip may allow at least six working layers to be produced simultaneously.

According to another alternative form of embodiment of the invention, the complex strip is wound circumferentially to form radially juxtaposed turns. Such an alternative form of embodiment allows two working layers to be created without creating any excess thickness.

According to a first embodiment of the invention, the reinforcing elements of the complex strip are made of metal.

Advantageously, according to this first embodiment of the invention, the reinforcing elements of the complex strip are metal reinforcing elements having a secant modulus at 0.7% elongation of between 10 and 120 GPa and a maximum tangent modulus of less than 150 GPa.

According to a preferred embodiment, the secant modulus of the reinforcing elements at 0.7% elongation is less than 100 GPa and greater than 20 GPa, preferably is comprised between 30 and 90 GPa and more preferably still is less than 80 GPa.

For preference also, the maximum tangent modulus of the reinforcing elements is less than 130 GPa and more preferably still, less than 120 GPa.

The modulus values expressed hereinabove are measured on a curve of tensile stress as a function of elongation determined with a preload of 20 MPa divided by the cross section of metal in the reinforcing element, the tensile stress corresponding to a measured tension divided by the cross section of metal in the reinforcing element.

The modulus values for the same reinforcing elements can be measured on a curve of tensile stress as a function of elongation determined with a preload of 10 MPa divided by the overall cross section of the reinforcing element, the tensile stress corresponding to a measured tension divided by the overall cross section of the reinforcing element. The overall cross section of the reinforcing element is the cross section of a composite reinforcing element made of metal and rubber, the latter having notably penetrated the reinforcing element during the tire curing phase.

According to this formulation relating to the overall cross section of the reinforcing element, the reinforcing elements of the complex strip are metal reinforcing elements having a secant modulus of between 5 and 60 GPa at 0.7% elongation and a maximum tangent modulus of less than 75 GPa.

According to a preferred embodiment, the secant modulus of the reinforcing elements at 0.7% elongation is less than 50 GPa and greater than 10 GPa, preferably is comprised between 15 and 45 GPa and more preferably still is less than 40 GPa.

For preference also, the maximum tangent modulus of the reinforcing elements is less than 65 GPa and more preferably still, less than 60 GPa.

According to a preferred embodiment, the reinforcing elements of the complex strip are metal reinforcing elements having a curve of tensile stress as a function of relative elongation that exhibits shallow gradients for small elongations and a substantially constant and steep gradient for higher elongations. Such reinforcing elements in the additional ply are generally known as "bi-modulus" elements.

According to a preferred embodiment of the invention, the substantially constant and steep gradient appears starting from a relative elongation of between 0.1% and 0.5%.

The various characteristics of the reinforcing elements as mentioned hereinabove are measured on reinforcing elements taken from tires.

Reinforcing elements more particularly suited to producing the complex strip according to an embodiment of the invention are, for example, assemblies of formula 21.23, the construction of which is 3×(0.26+6×0.23) 4.4/6.6 SS; this stranded cord consists of 21 elementary threads of formula 3×(1+6), with 3 strands twisted together, each consisting of 7 threads, one thread forming a central core with a diameter equal to $26/100$ mm and 6 wound threads with a diameter equal to $23/100$ mm. Such a cord has a secant modulus equal to 45 GPa at 0.7% and a maximum tangent modulus equal to 98 GPa, measured on a curve of tensile stress as a function of elongation determined with a preload of 20 MPa divided by the cross section of metal in the reinforcing element, the tensile stress corresponding to a measured tension divided by the cross section of metal in the reinforcing element. On a curve of tensile stress as a function of elongation determined with a preload of 10 MPa divided by the overall cross section of the reinforcing element, the tensile stress corresponding to a measured tension divided by the overall cross section of the reinforcing element, this cord of formula 21.23 has a secant modulus equal to 23 GPa at 0.7% and a maximum tangent modulus equal to 49 GPa.

Likewise, another example of reinforcing elements is an assembly of formula 21.28, the construction of which is 3×(0.32+6×0.28) 6.2/9.3 SS. This cord has a secant modulus equal to 56 GPa at 0.7% and a maximum tangent modulus equal to 102 GPa, measured on a curve of tensile stress as a function of elongation determined with a preload of 20 MPa divided by the cross section of metal in the reinforcing element, the tensile stress corresponding to a measured tension divided by the cross section of metal in the reinforcing element. On a curve of tensile stress as a function of elongation determined with a preload of 10 MPa divided by the overall cross section of the reinforcing element, the tensile stress corresponding to a measured tension divided by the overall cross section of the reinforcing element, this cord of formula 21.28 has a secant modulus equal to 27 GPa at 0.7% and a maximum tangent modulus equal to 49 GPa.

The use of such reinforcing elements in the complex strip notably makes it possible to produce the tube and to flatten the said tube simply using the method described hereinabove, at the same time limiting the risks of the reinforcing elements breaking and improving the ability of the complex strip to remain flat after it has been produced, notably when the angle formed between the circumferential direction and the reinforcing elements of the two working crown layers is greater than 40°.

The metal elements are preferably steel cords.

According to a second embodiment of the invention, the reinforcing elements of the complex strip are made of a textile material such as materials of nylon, aramid, PET, rayon, polyketone type.

According to a third embodiment of the invention, the reinforcing elements of the complex strip are made of a hybrid material. These may be textile hybrid materials such as reinforcing elements consisting of aramid and of nylon like those described in document WO 02/085646 or alternatively may be hybrid materials combining textile materials and metallic materials.

Producing the complex strip using textile or hybrid reinforcing elements notably makes it possible to afford advantages particularly in terms of endurance without too greatly penalizing the mass of the tire, even when compared to a single additional layer of metal reinforcing elements.

According to one more particularly advantageous embodiment of the invention, the additional complex strip is axially on the outside of the carcass reinforcement. According to this embodiment of the invention, the additional complex strip notably provides a function of protecting the bead against the rim, or more specifically against the rim flange when the tire is mounted on the said rim.

Advantageously also, with the carcass reinforcement being anchored in each of the beads by turning at least one layer of reinforcing elements back around a bead wire to form a turn-back, the radially outer end of the additional complex strip is radially on the outside of the turned-back end of the carcass reinforcement. According to such an embodiment, with the tire comprising a carcass reinforcement that forms a turn-back around a bead wire, the additional complex strip covers the end of the said turn-back to reduce or even eliminate the effects of the ends of the reinforcing elements of the carcass reinforcement.

Furthermore, according to an embodiment of the invention, because the complex strip does not have any reinforcing element free ends, that means that potential sources of disturbance of the polymer compounds are no longer created.

According to an advantageous alternative form of embodiment of the invention, the crown reinforcement is formed of at least two layers of reinforcing elements, the angle formed with the circumferential direction by the said reinforcing elements being less than 30° and preferably less than 25°.

One embodiment of the invention is also for the crown reinforcement to be supplemented radially on the outside by at least one supplementary layer, known as a protective layer, of reinforcing elements know as elastic elements, oriented with respect to the circumferential direction at an angle of between 10° and 45° and in the same direction as the angle formed by the inextensible elements of the working layer radially adjacent to it.

The crown reinforcement may be further supplemented, for example radially between the carcass reinforcement and the radially innermost working layer, by a triangulation layer consisting of inextensible reinforcing elements which make an angle greater than 40° with the circumferential direction, and preferably an angle in the same direction as the angle formed by the reinforcing elements of the radially closest layer of the carcass reinforcement.

In an embodiment of the invention, the crown reinforcement of the tire comprises at least one continuous layer of circumferential reinforcing elements the axial width of which is preferably less than the axial width of the axially widest working crown layer.

BRIEF DESCRIPTION OF THE DRAWINGS

Further details and advantageous features of the invention will become apparent hereinafter from the description of some exemplary embodiments of the invention with reference to FIGS. 1 to 3 which depict.

To make them easier to understand, the figures are not drawn to scale.

Figure 1:
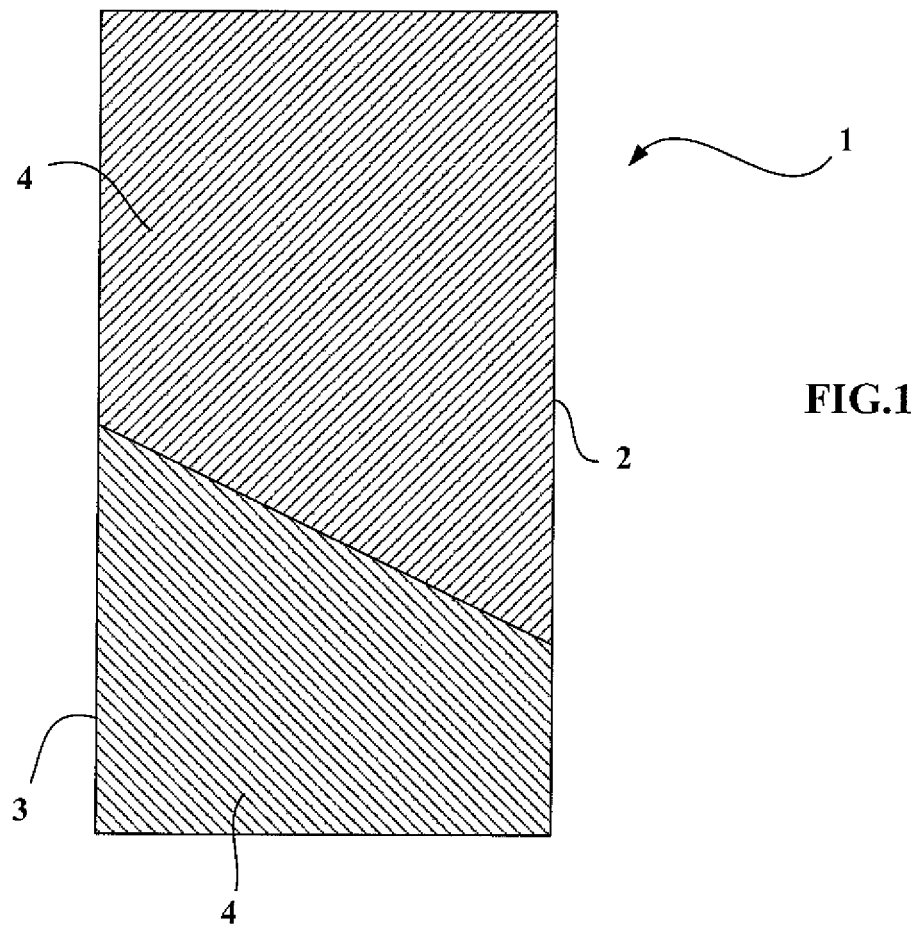
FIG. 1: a perspective view, with cutaway, of a complex strip according to an embodiment of the invention.

FIG. 1 depicts a diagram, with cutaway, of a complex strip 1 consisting of two layers 2, 3 of reinforcing elements 4 making an angle with the circumferential direction, parallel within one layer and crossed from one layer to the other with angles with respect to the circumferential direction that are identical in terms of absolute value.

The complex strip 1 is obtained according to a method which involves flattening a tube formed by winding in contiguous turns at a given angle with respect to the longitudinal direction of the tube, a tape in which reinforcing elements are parallel to one another and to the longitudinal direction of the said tape and coated in a polymer compound. When the tube is flattened, because the turns are perfectly contiguous, the complex strip obtained consists of two layers of continuous reinforcing elements passing from one layer to the other.

Producing a tube with contiguous turns makes it possible to obtain linear reinforcing elements 4 in each of the layers, with the exception of the axial ends of each of the layers where the reinforcing elements form loops to provide continuity from one layer to the next.

Figure 2:
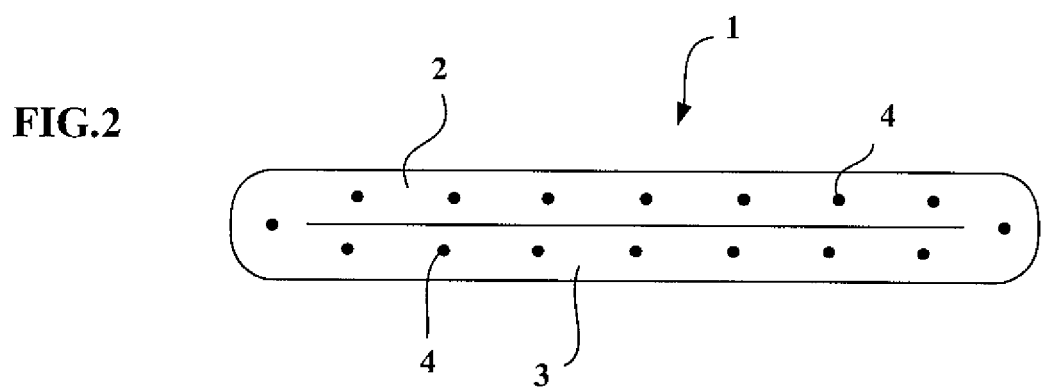
FIG. 2: a meridian view of the complex strip of FIG. 1.

FIG. 2 corresponds to a meridian view of a schematic depiction of such a complex strip 1. This figure shows that the complex strip 1 consists of the two layers 2, 3 of reinforcing elements 4 in which the said reinforcing elements are continuous from one layer to the other.

The complex strip 1 thus depicted in the figures has the advantage of constituting a system of two layers of reinforcing elements that are parallel to one another and crossed from one layer to the next, the said layers not having any free ends of reinforcing elements.

The complex strip 1 is produced from a tape consisting of reinforcing elements having a diameter equal to 1.14 mm embedded in two liners 0.11 mm thick. Each of the layers thus has a thickness of 1.36 mm and the complex strip has a thickness of 2.72 mm, the radial distance between the respective reinforcing elements of each of the crown layers being equal to 0.22 mm. The radial distance between the respective reinforcing elements of each of the crown layers is equal to the sum of the thicknesses of the liner radially on the outside of the reinforcing elements of the radially inner layer and of the liner radially on the inside of the reinforcing elements of the radially outer layer.

Figure 3:
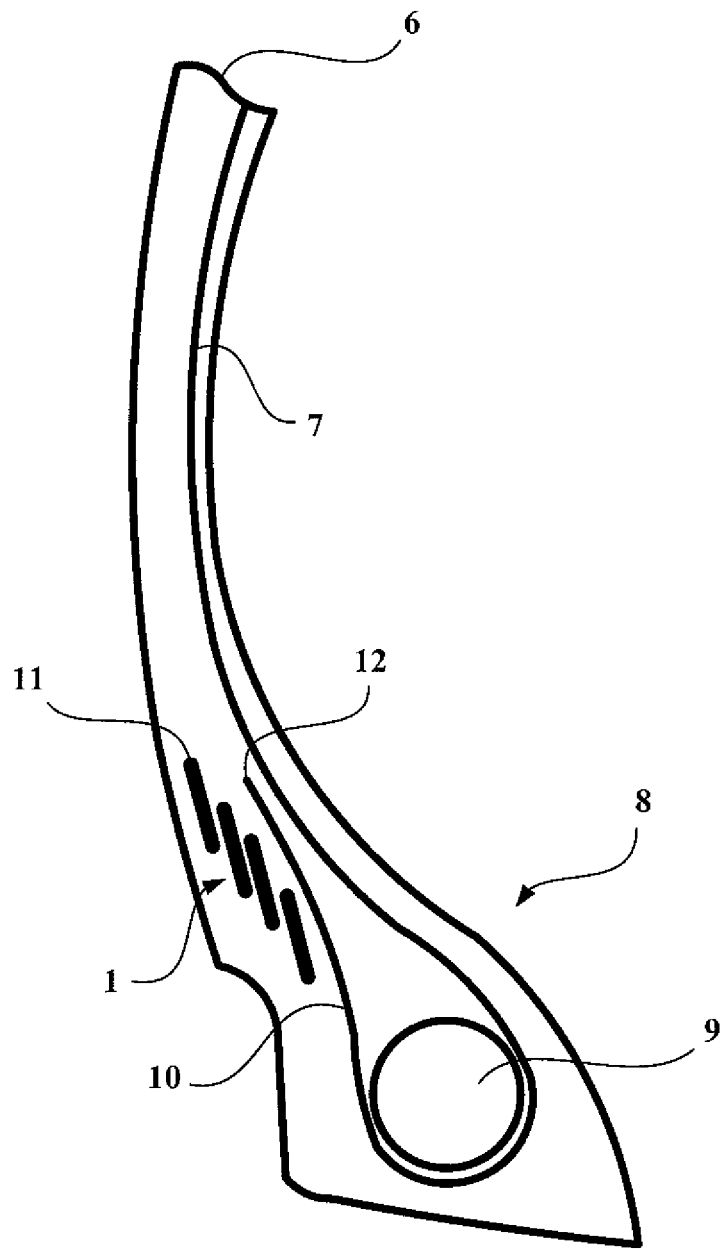
FIG. 3: a meridian view of a bead of a tire comprising the complex strip of FIG. 1, according to an embodiment of the invention.

FIG. 3 illustrates a bead 5 of a tire 6 of dimension 295/60 R 22.5 X. The said tire 6 comprises a radial carcass reinforcement 7 anchored in two beads 8. The carcass reinforcement 7 is formed as a single layer of metal cords turned back around a bead wire 9 to form a turn-back 10.

A complex strip 1 is laid by circumferential winding to form two layers of reinforcing elements axially adjacent to the turn-back 10 of the carcass reinforcement 7. Winding in this depiction is performed in such a way as to obtain an axial overlap by half the strip on each turn. The winding of the complex strip 1 thus forms four radially superposed layers of reinforcing elements that are parallel to one another within one and the same layer and crossed from one layer to the next with no free ends.

According to other alternative forms of embodiment, the turns formed when winding the complex strip may be juxtaposed so as to form just two radially superposed layers of elements. The turns may even be axially overlapped by ⅔ of the width of the complex strip, during the winding, to form six radially superposed layers.

The reinforcing elements in the additional complex strip are of the aliphatic polyamide 140×2 type.

The circumferential winding of the complex strip 1 is performed in such a way that the radially outer end 11 of the complex strip is radially on the outside of the radially outer end 12 of the turn-back 10 of the carcass reinforcement 7.

Tests have been run with the tire produced according to the invention as depicted in FIG. 3 and compared against a reference tire that was identical, but produced with a conventional configuration, that is to say without the additional complex strip, but having a single layer of metallic reinforcing elements of type 3.18 NF forming an angle of 22° with the circumferential direction.

The tests were run using reinforcing elements in the additional complex strip that were made of textile of the aliphatic polyamide 140×2 type.

The first endurance tests were run by fitting identical vehicles with each of the tires and making each of the vehicles run a course in a straight line, the tires being subjected to loading in excess of the nominal loading in order to accelerate this type of test.

The reference vehicle with the conventional tires was associated with a loading per tire of 3600 kg at the start of the run, progressing up to a loading of 4350 kg at the end of the run.

The vehicle with the tires according to the invention was associated with a loading per tire of 3800 kg at the start of the run, progressing up to a loading of 4800 kg at the end of the run.

The tests were stopped when the tire became damaged and/or no longer worked in the normal way.

The tests thus run demonstrated that the vehicle fitted with tires according to the invention covered a distance equivalent to the distance covered by the reference vehicles. It is therefore apparent that the tires according to the invention perform better than the reference tires because they were subjected to higher loading stresses.

Other endurance tests were run on a test machine by alternating sequences of cornering to the left, cornering to the right and then driving in a straight line under loading conditions varying from 60 to 200% of the nominal load and with thrusts varying from 0 to 0.35 times the applied load. The speeds were between 30 and 70 km/h. The tests were stopped when the tire became damaged and/or no longer operated normally.

The results obtained showed gains in distances covered by the tires according to the invention that were higher than the distances covered by the reference tires.

The invention claimed is:

1. A tire with a radial carcass reinforcement comprising a crown reinforcement, itself radially capped by a tread strip, said tread strip being connected to two beads via two sidewalls, the carcass reinforcement being anchored in each of the beads to form an anchorage region, and, in part of at least each of the anchorage regions, at least two layers being formed by circumferential winding of a complex strip formed of two layers including continuous reinforcing elements passing from one layer to the other, said reinforcing elements being parallel within a layer and crossed from one layer to the other at angles with respect to the circumferential direction that are identical in terms of absolute value.

2. The tire according to claim 1, wherein the reinforcing elements of said complex strip make an angle of between 10 and 45° with the circumferential direction.

3. The tire according to claim 1, wherein the complex strip is wound circumferentially with an axial overlap.

4. The tire according to claim 1, wherein the complex strip is wound circumferentially to form juxtaposed turns.

5. The tire according to claim 1, wherein the reinforcing elements of the complex strip are made of metal.

6. The tire according to claim 5, wherein the reinforcing elements of the complex strip are metal reinforcing elements having a secant modulus at 0.7% elongation of between 10 and 120 GPa and a maximum tangent modulus of less than 150 GPa.

7. The tire according to claim 1, wherein the reinforcing elements of the complex strip are made of a textile material.

8. The tire according to claim 1, wherein the reinforcing elements of the complex strip are made of a hybrid material.

9. The tire according to claim 1, wherein said complex strip is axially on the outside of the carcass reinforcement.

10. The tire according to claim 1, the carcass reinforcement being anchored in each of the beads by turning at least one layer of reinforcing elements back around a bead wire to form a turn-back, wherein the radially outer end of the complex strip is radially on the outside of the turned-back end of the carcass reinforcement.

11. The tire according to claim 1, wherein the complex strip is wound circumferentially with an axial overlap equal to at least half the width of said complex strip.

\* \* \* \* \*